(12) United States Patent
Han et al.

(10) Patent No.: US 10,076,953 B1
(45) Date of Patent: Sep. 18, 2018

(54) ENGINE MOUNTING STRUCTURE (71) Applicants: Hyundai Motor Company, Seoul (KR); Kia Motors Corporation, Seoul (KR)

(72) Inventors: Ki-Seok Han, Ansan-si (KR); Tae-Woo Kim, Hwaseong-si (KR); Jeong-Hun Choi, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/688,697

(22) Filed: Aug. 28, 2017

(30) Foreign Application Priority Data

Mar. 27, 2017 (KR) .......................... 10-2017-0038266

(51) Int. Cl.
*B60K 5/12* (2006.01)
*F16H 57/04* (2010.01)

(52) U.S. Cl.
CPC .......... *B60K 5/12* (2013.01); *F16H 57/0413* (2013.01); *F01P 2060/045* (2013.01)

(58) Field of Classification Search
CPC ... F16M 5/00; F16M 7/00; B60K 5/12; B60K 5/1208; B60K 5/1233
USPC ........ 180/300, 291, 299, 68.1, 312; 248/674
See application file for complete search history.

(56) References Cited

U.S. PATENT DOCUMENTS

| | | | | |
|---|---|---|---|---|
| 4,546,848 A * | 10/1985 | Iijima | ............... | B60K 17/16 180/312 |
| 5,090,502 A * | 2/1992 | Inoue | ............... | B60K 5/1291 180/292 |
| 5,145,156 A * | 9/1992 | Muramatsu | ............ | F16F 13/18 180/300 |
| 5,174,541 A * | 12/1992 | Hutter | ............... | B60K 5/1208 180/312 |
| 5,193,642 A * | 3/1993 | Miyake | ............... | B60K 5/1216 180/300 |
| 5,263,815 A * | 11/1993 | Brenner | ............... | F16F 13/06 180/300 |
| 5,305,847 A * | 4/1994 | Mefford | ............... | B60K 5/1216 180/291 |
| 5,375,821 A * | 12/1994 | Toshimitsu | ......... | B60K 5/1216 180/312 |
| 5,454,443 A * | 10/1995 | Fischle | ............... | B60K 5/1216 180/291 |
| 5,570,757 A * | 11/1996 | Courtwright | ........... | B60K 5/12 180/291 |
| 5,645,138 A * | 7/1997 | Tajima | ............... | F16F 13/16 180/300 |
| 5,718,407 A * | 2/1998 | Lee | ............... | F16F 1/3842 180/312 |
| 5,954,309 A * | 9/1999 | Kato | ............... | B60K 5/1208 180/312 |

(Continued)

*Primary Examiner* — Jeffrey J Restifo
(74) *Attorney, Agent, or Firm* — Morgan, Lewis & Bockius LLP (57) ABSTRACT

An engine mounting structure is configured to includes an engine which is disposed in an engine compartment; an engine mount which fixes the engine to a vehicle body; and an engine support bracket which fixes a first side surface of the engine to the engine mount, in which the engine support bracket includes a cooling portion which cools the engine support bracket by use of a fluid flowing into the engine compartment.

9 Claims, 7 Drawing Sheets

(56) References Cited

U.S. PATENT DOCUMENTS

| | | | | |
|---|---|---|---|---|
| 6,082,718 | A * | 7/2000 | Yamada | F16F 13/105 180/300 |
| 6,199,516 | B1 * | 3/2001 | Katayama | B60K 5/12 123/195 R |
| 6,224,045 | B1 * | 5/2001 | Muramatsu | F16F 13/106 267/140.11 |
| 6,264,181 | B1 * | 7/2001 | Muramatsu | F16F 13/264 267/140.13 |
| 6,962,229 | B2 * | 11/2005 | Miyahara | B60K 5/1208 180/291 |
| 6,997,276 | B2 * | 2/2006 | Yoshida | B60G 99/00 180/232 |
| 7,040,446 | B2 * | 5/2006 | Anzai | B60K 5/1275 180/234 |
| 7,140,603 | B2 * | 11/2006 | Maeno | B60K 5/1208 267/140.13 |
| 7,207,553 | B2 * | 4/2007 | Arakawa | B60K 5/1216 267/140.13 |
| 7,210,674 | B2 * | 5/2007 | Maeno | F16F 13/264 267/140.13 |
| 7,575,088 | B2 * | 8/2009 | Mir | B60K 5/1208 180/297 |
| 7,617,903 | B2 * | 11/2009 | Byers | A63H 17/262 180/291 |
| 7,654,543 | B2 * | 2/2010 | Tanaka | B60G 7/02 180/312 |
| 7,766,118 | B2 * | 8/2010 | Ohji | B60K 5/12 180/291 |
| 7,871,108 | B2 * | 1/2011 | Weibling | B62D 55/32 180/312 |
| 8,132,640 | B2 * | 3/2012 | Heitkamp | B60K 17/24 180/232 |
| 8,348,007 | B2 * | 1/2013 | Hermann | B60K 5/12 180/312 |
| 8,523,136 | B2 * | 9/2013 | Patel | B60K 5/1208 180/312 |
| 8,672,080 | B2 * | 3/2014 | Tamura | F16F 13/103 180/291 |
| 8,925,512 | B2 * | 1/2015 | Kitada | F01P 3/00 123/193.5 |
| 8,955,809 | B2 * | 2/2015 | Vignali | B64C 1/00 244/58 |
| 9,180,914 | B2 * | 11/2015 | Yamamoto | B62D 25/00 |
| 9,242,541 | B2 * | 1/2016 | Kim | F16F 15/08 |
| 9,567,729 | B2 * | 2/2017 | Sumiyoshi | B60K 5/02 |
| 9,676,264 | B2 * | 6/2017 | Kim | B60K 5/1208 |
| 9,689,457 | B2 * | 6/2017 | Kojima | B60K 5/1241 |
| 9,738,147 | B2 * | 8/2017 | Hlubina | B60K 5/12 |

* cited by examiner

ENGINE MOUNTING STRUCTURE

CROSS-REFERENCE TO RELATED APPLICATIONS

The present application claims priority to Korean Patent Application No. 10-2017-0038266, filed on Mar. 27, 2017, the entire contents of which is incorporated herein for all purposes by this reference.

BACKGROUND OF THE INVENTION

Field of the Invention

The present invention relates to an engine mounting structure which is mounted on a vehicle body and supports an engine, and particularly, to an engine mount bracket which connects one side of an engine and an engine mount mounted on a vehicle body.

Description of Related Art

In a case in which an output of an engine is increased or a configuration including a turbocharger is added to improve performance of a vehicle, a temperature in an engine compartment is generally increased. Therefore, there is a problem in that components disposed in the engine compartment are thermally damaged due to the increase in temperature in the engine compartment. In particular, there is a problem in that a starter motor is very vulnerable to thermal damage because the starter motor is disposed close to a warm-up catalytic converter (WCC).

Figure 1:
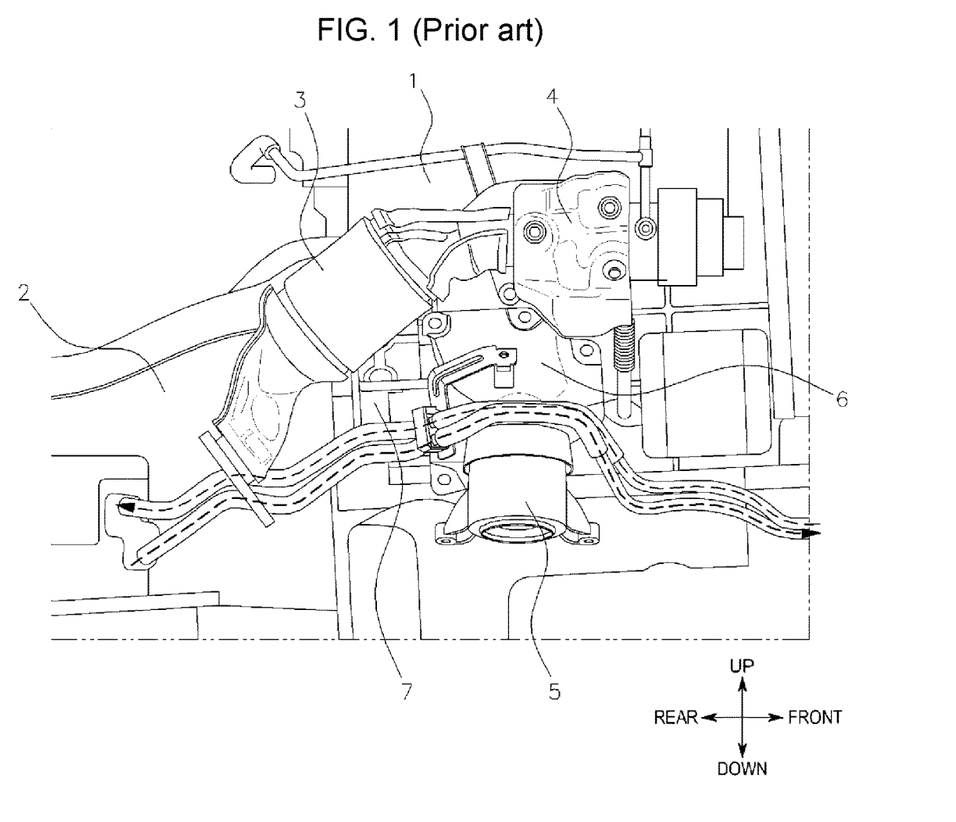
FIG. 1 is a view illustrating an appearance of an engine compartment in the related art.

FIG. 1 is a view illustrating an appearance of an engine compartment in the related art. Referring to FIG. 1, an engine 1 and a transmission 2 are disposed in the engine compartment, and a WCC 3 and a turbocharger 4, through which exhaust gas from the engine 1 flows, are disposed at one side of the engine 1. An engine mount 5 is provided below the WCC 3 and the turbocharger 4, and the engine mount 5 fixes an engine support bracket 6, which is fastened to one side of the engine 1, to a vehicle body.

Meanwhile, a heat protector 7 is provided at one side of the engine 1 to which the engine support bracket 6 is fastened, and the heat protector 7 protects a starter motor disposed in the heat protector 7. That is, the heat protector 7 prevents heat, which is generated from a heat source such as the WCC 3 and the turbocharger 4, from being transferred to the starter motor, preventing the starter motor from being damaged due to heat.

However, according to the structure in the related art, the engine support bracket 6 itself acts as a secondary heat source due to continuous heat accumulation caused when heat is continuously generated from the heat source such as when the vehicle travels a long distance, and as a result, there is a problem in that the engine support bracket 6 heats the heat protector 7.

The heat protector 7 cannot effectively discharge the transmitted heat, and as a result, there is a problem in that the heat protector 7 cannot perfectly block the heat.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a structure configured for preventing heat from being accumulated in an engine support bracket.

The present invention, in various aspects, has also been made in an effort to provide an engine support bracket structure configured for discharging heat from a heat protector.

The present invention, in various aspects, has also been made in an effort to provide a structure configured for stably cooling an engine support bracket.

Various aspects of the present invention are directed to providing an engine mounting structure including: an engine which is disposed in an engine compartment; an engine mount which fixes the engine to a vehicle body; and an engine support bracket which fixes one side surface of the engine to the engine mount, in which the engine support bracket includes a cooling portion which is cooled by a fluid flowing into the engine compartment.

The engine mounting structure may further include: a transmission which is provided at one side of the engine; and a transmission oil supply pipe which extends from an oil cooler toward the transmission and through which transmission oil flows, in which the cooling portion is a cooling path which exchanges heat with the transmission oil flowing into the transmission oil supply pipe.

The transmission oil supply pipe may include: a first transmission oil pipe which extends from the oil cooler toward the cooling path; and a second transmission oil pipe which extends from the cooling path toward the transmission, and the cooling path may include: an expanded tube portion which is connected to the first transmission oil pipe and has a diameter that is gradually increased toward a downstream side; and a shrunk tube portion which connects the expanded tube portion and the second transmission oil pipe, and has a diameter that is gradually decreased toward the downstream side.

A flow velocity of the transmission oil passing through the expanded tube portion may be gradually decreased, a flow velocity of the transmission oil passing through the shrunk tube portion may be gradually increased, and the flow velocity of the transmission oil may be lowest at a boundary between the expanded tube portion and the shrunk tube portion.

The engine support bracket may further include: a first engine fastening portion which is provided on an upper portion of the engine support bracket and abuts one side surface of the engine; a second engine fastening portion which is provided on a lower portion of the engine support bracket and abuts one side surface of the engine; a mount fastening portion which is provided at one side portion of the engine support bracket and to which the engine mount is fastened; and an extension portion which connects the first engine fastening portion and the mount fastening portion, and connects the second engine fastening portion and the mount fastening portion, and the cooling portion may be an air flow path through which air flowing into an external space of the engine support bracket flows into a space between the first engine fastening portion and the second engine fastening portion.

The air flow path may include: an intake port which is opened in a direction in which a moving means moves forward thereof; and a discharge port which is opened in a direction in which the moving means moves rearward.

The engine mounting structure may further include: a transmission which is provided at one side of the engine; and a transmission oil pipe through which transmission oil flows from an oil cooler toward the transmission, in which a cooling path, which exchanges heat with a refrigerant flowing into the transmission oil pipe, is provided in the extension portion.

The cooling path may include: an expanded tube portion into which cooled transmission oil flows from the transmission oil pipe and which has a diameter that is gradually increased toward a downstream side; and a shrunk tube portion through which the transmission oil passing through the expanded tube portion is discharged to the transmission oil pipe and which has a diameter that is gradually decreased toward the downstream side.

The engine mounting structure may further include a heat protector which is disposed on one side surface of the engine, and prevents heat from being transferred from an external of the engine to an internal of the engine, in which the engine support bracket is disposed to abut the heat protector, and absorbs heat of the heat protector.

The engine may include a starter motor, and the heat protector may prevent heat from being transferred from the engine compartment to the starter motor.

The engine support bracket may be formed integrally or monolithically with the heat protector.

The present invention, which is configured as described above, has the cooling portion therein, and as a result, it is possible to prevent heat from being accumulated in the engine support bracket, and discharge heat of the heat protector.

Since the cooling operation is performed by use of different types of fluids, the cooling operation may be stably performed even though any one cooling system is stopped.

Because a separate cooling device is not operated, there is no loss of power required for the cooling operation.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the Field of the Invention to which the present invention pertains may easily carry out the exemplary embodiment. However, the present invention may be implemented in various different ways, and is not limited to the exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 2:
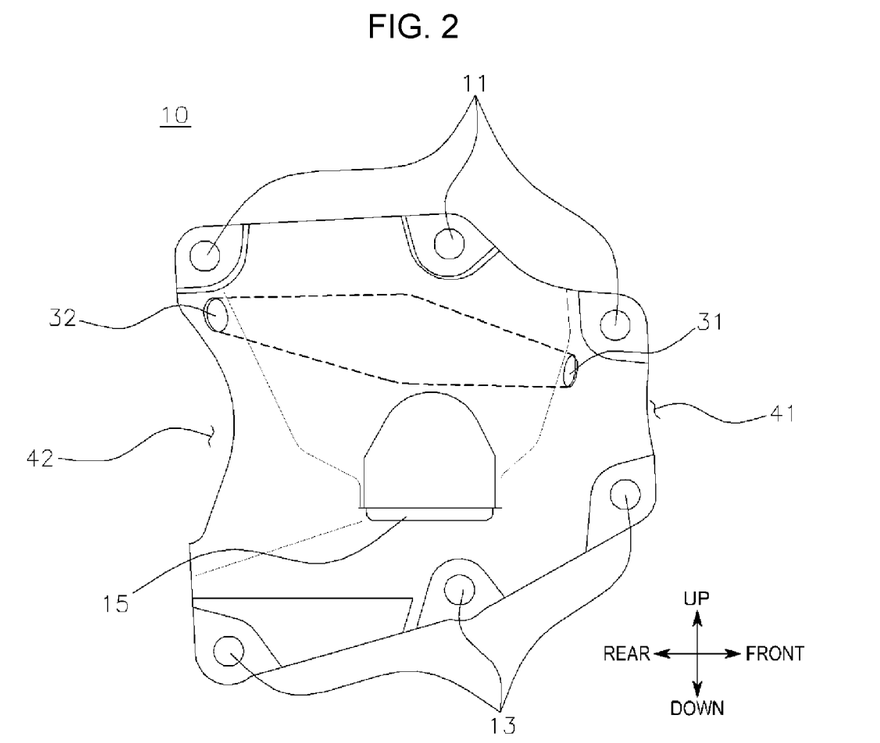
FIG. 2, FIG. 3 and FIG. 4 are views illustrating an engine support bracket according to an exemplary embodiment of the present invention.
Figure 3:
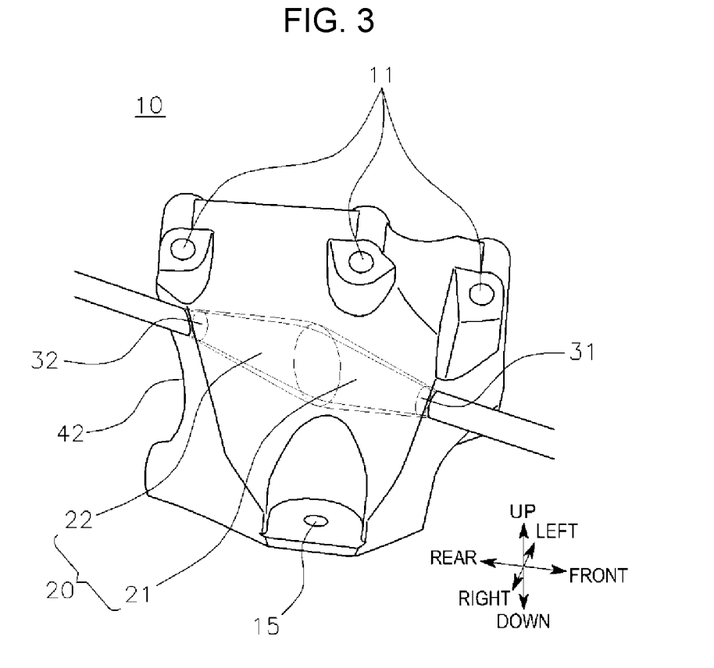
Figure 4:
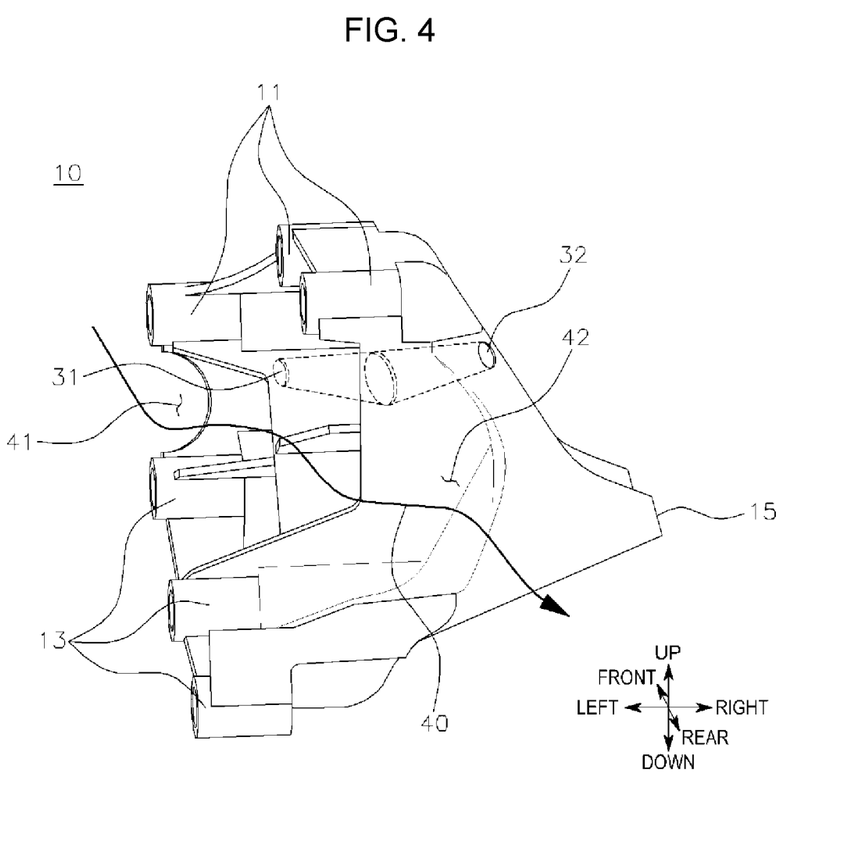

FIG. 2, FIG. 3 and FIG. 4 are views illustrating an engine support bracket according to an exemplary embodiment of the present invention. Referring to FIG. 2, FIG. 3 and FIG. 4, an engine mounting structure according to an exemplary embodiment of the present invention includes an engine 1 which is disposed in an engine compartment, an engine mount 5 which fixes the engine 1 to a vehicle body, and an engine support bracket 10 which fixes one side surface of the engine 1 to the engine mount 5.

The engine support bracket 10 includes engine fastening portions 11 and 13 which are fastened to one surface of the engine 1, a mount fastening portion 15 which is fastened to the engine mount 5, and cooling portions 20 and 40 which cool the engine support bracket 10.

The engine fastening portions 11 and 13 may form an upper portion and a lower portion of the engine support bracket 10, respectively, and may include surfaces that may be in contact with one surface of the engine 1. As an example, the engine fastening portions 11 and 13 may include surfaces which are in contact with one side surface of the engine 1.

The engine fastening portions 11 and 13 include first engine fastening portions 11 which form the upper portion of the engine support bracket 10, and second engine fastening portions 13 which form the lower portion of the engine support bracket 10. The first engine fastening portion 11 and the second engine fastening portion 13 may be disposed to be distanced from each other at a predetermined distance in an up and down direction thereof. An air flow path 40 may be formed in a space between the first engine fastening portion 11 and the second engine fastening portion 13. The air flow path 40 will be described below in detail.

The first engine fastening portions 11 and the second engine fastening portions 13 may include a plurality of fastening holes, respectively, and fastening members penetrate the plurality of fastening holes, respectively, fastening the upper and lower portions of the engine support bracket 10 to one surface of the engine 1.

The mount fastening portion 15 may be provided at one side portion of the engine support bracket 10. The mount fastening portion 15 may include a fastening hole, and a core of the engine mount 5 penetrates the fastening hole, fastening one side portion of the engine support bracket 10 to the engine mount 5.

Meanwhile, the engine support bracket 10 may include an extension portion which extends from the engine fastening portions 11 and 13 to the mount fastening portion 15. The extension portion may extend from the first engine fastening portion 11 to the mount fastening portion 15, and may extend from the mount fastening portion 15 to the second engine fastening portion 13. An external surface of the extension portion may define an external surface of the engine support bracket 10. Meanwhile, the external surface may be formed in various shapes in accordance with a flow of air flowing into the engine compartment. A plurality of reinforcing ribs may be formed inside the external surface, reinforcing rigidity of the engine support bracket 10.

A configuration in which the extension portion connects the engine fastening portions 11 and 13 and the mount fastening portion 15 is described, but the present invention is not limited thereto, and it may be appreciated that the engine fastening portions 11 and 13 and the mount fastening portion 15 are formed at an upper portion, a lower portion, and one side surface of the extension portion.

The cooling portions 20 and 40 may be provided at a center portion of the engine support bracket 10. In the instant case, the center portion may mean an internal portion surrounded by the upper portion of the engine support bracket which is configured by the first engine fastening portions 11, the lower portion of the engine support bracket which is configured by the second engine fastening portions 13, and one side portion of the engine support bracket which is configured by the mount fastening portion 15.

The cooling portions 20 and 40 may include a cooling path 20 which exchanges heat with cooled transmission oil. The cooling path 20 includes an expanded tube portion 21 of which the diameter is gradually increased from an upstream side to a downstream side, and a shrunk tube portion 22 of which the diameter is gradually decreased from the upstream side to the downstream side. In the instant case, the upstream and downstream sides are defined based on a flow direction of the flowing transmission oil, the upstream side means a direction in which the transmission oil is introduced, and the downstream side means a direction in which the transmission oil is discharged. Therefore, the expanded tube portion 21 is disposed at the upstream side from the shrunk tube portion 22, and the transmission oil passes through the expanded tube portion 21 and then flows into the shrunk tube portion 22.

A flow velocity is decreased as the transmission oil flows into the expanded tube portion 21 because a cross-sectional area of a flow path is increased. The amount of exchanged heat may be increased as the flow velocity of the transmission oil decreases. In contrast, a flow velocity is increased as the transmission oil flows into the shrunk tube portion 22 because a cross-sectional area of a flow path is decreased. As the decreased flow velocity of the transmission oil is increased again, the transmission oil may be smoothly circulated. Meanwhile, a boundary surface between the expanded tube portion 21 and the shrunk tube portion 22 has a maximum cross-sectional area of the cooling path 20, and a flow velocity of the transmission oil is lowest.

An inlet 31 through which the transmission oil is introduced into the expanded tube portion 21 and an outlet 32 through which the transmission oil in the shrunk tube portion 22 is discharged to the outside may be provided in an external surface of the engine support bracket 10. A cross-sectional area of each of the inlet 31 and the outlet 32 is smaller than a cross-sectional area of the boundary surface.

The inlet 31 may be opened at one side, and the outlet 32 may be opened at the other side. As an example, the inlet 31 may be opened in a direction toward an oil cooler, and the outlet 32 may be opened in a direction toward a transmission. As another example, the inlet 31 is opened in a direction in which a moving means moves forward, and the outlet 32 is opened in a direction in which the moving means moves rearward.

The cooling portions 20 and 40 may include the air flow path 40. The air flow path 40 includes an intake port 41 which is opened in the direction in which the moving device moves forward, and a discharge port 42 which is opened in the direction in which the moving means moves rearward. An operation of cooling the engine support bracket 10 by the cooling portions 20 and 40 will be described in detail.

Meanwhile, the cooling portions 20 and 40 may include only one of the cooling path 20 and the air flow path 40, but the present invention is not limited thereto, and the cooling portions 20 and 40 may include both of the cooling path 20 and the air flow path 40. That is, as illustrated in FIG. 4, the cooling path 20 may be disposed adjacent to the mount fastening portion 15, and the air flow path 40 may be disposed adjacent to the engine 1.

As another aspect, the cooling path 20 may be disposed in the engine support bracket 10 while penetrating the extension portion, and the air flow path 40 may be disposed in a space between the extension portion and the engine 1.

Figure 5:
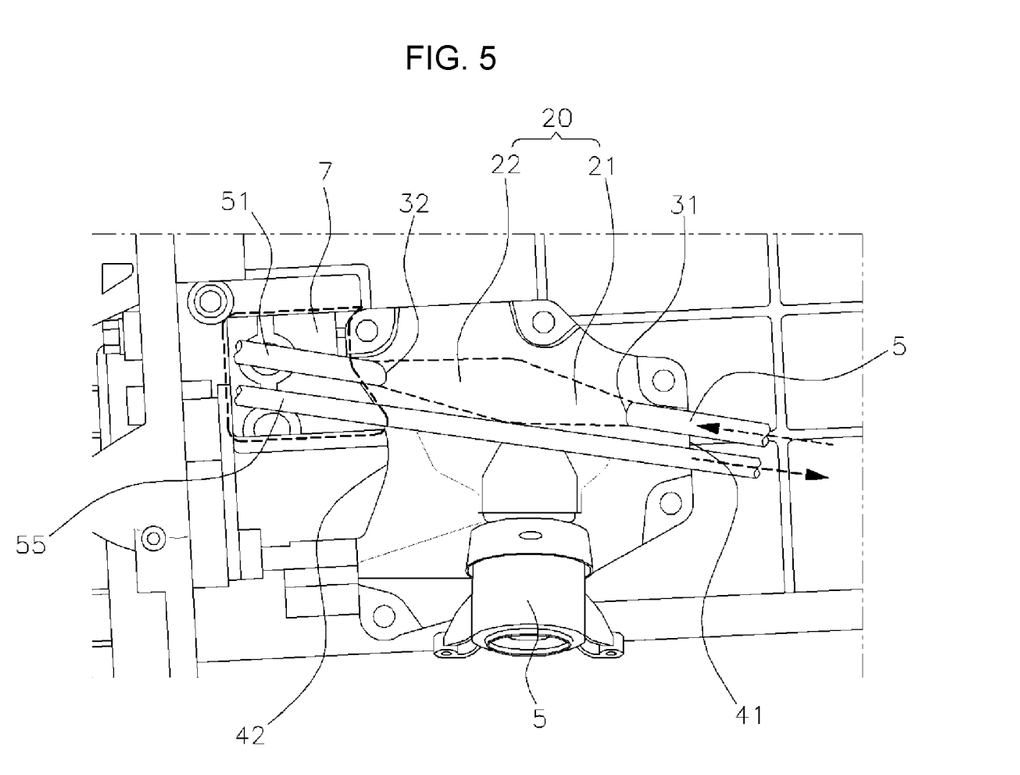
FIG. 5 is a view illustrating a state in which the engine support bracket according to the exemplary embodiment of the present invention is disposed in an engine compartment.
Figure 6:
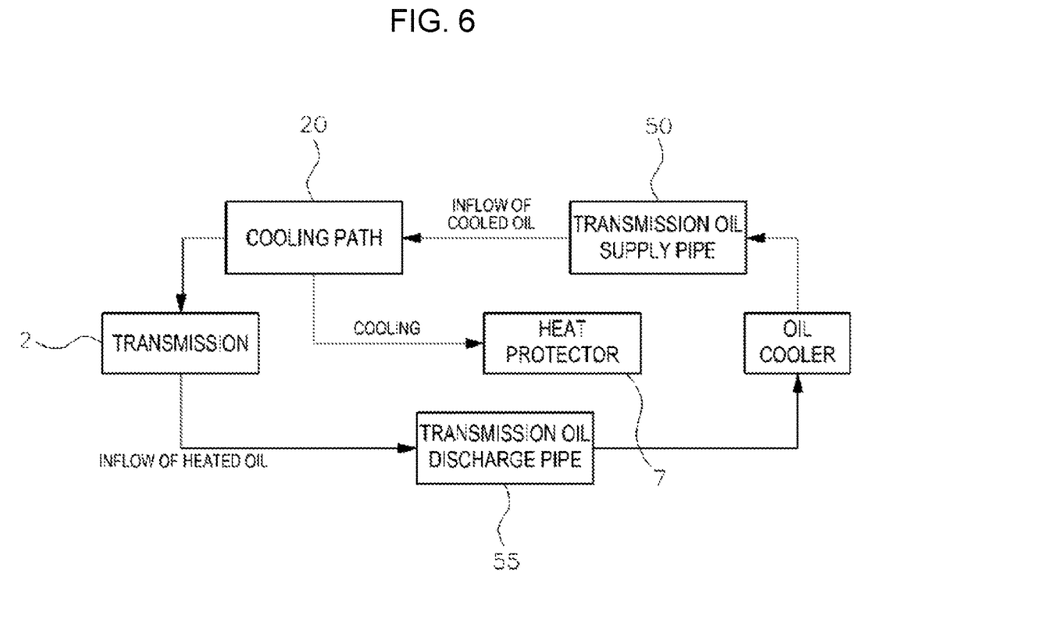
FIG. 6 is a view illustrating a state in which the engine support bracket according to the exemplary embodiment of the present invention is cooled by circulation of transmission oil.

FIG. 5 is a view illustrating a state in which the engine support bracket according to the exemplary embodiment of the present invention is disposed in an engine compartment, and FIG. 6 is a view illustrating a state in which the engine support bracket according to the exemplary embodiment of the present invention is cooled by circulation of transmission oil.

Referring to FIG. 5 and FIG. 6, a transmission 2 is disposed at one side of the engine 1, and a transmission oil supply pipe 50 for supplying transmission oil cooled by the oil cooler and a transmission oil discharge pipe 55 for discharging heated transmission oil to the oil cooler are connected to the transmission 2.

The transmission oil supply pipe 50 allows the transmission oil cooled by the oil cooler to pass through the cooling path 20, cooling the engine support bracket 10.

The transmission oil supply pipe 50 includes a first transmission oil pipe 51 which extends from the oil cooler toward the cooling path 20, and a second transmission oil pipe 52 which extends from the cooling path 20 toward the transmission 2. In the instant case, the first transmission oil pipe 51 is connected to the inlet 31 of the expanded tube portion 21, and the second transmission oil pipe 52 is connected to the outlet 32 of the shrunk tube portion 22.

The transmission oil, which is cooled by the oil cooler, is introduced into the cooling path 20 through the expanded tube portion 21, decreasing a temperature of the engine support bracket 10. That is, the engine support bracket 10 may discharge heat through the transmission oil. Meanwhile, the oil, which is discharged from the cooling path 20 through the shrunk tube portion 22, decreases a temperature of the transmission 2 while passing through the transmission 2, and returns to the oil cooler through the transmission oil discharge pipe 55.

With the aforementioned circulation of the transmission oil, it is possible to decrease a temperature of the engine support bracket 10, prevent heat from being accumulated in the engine support bracket 10, and cool the heat protector 7.

Figure 7:
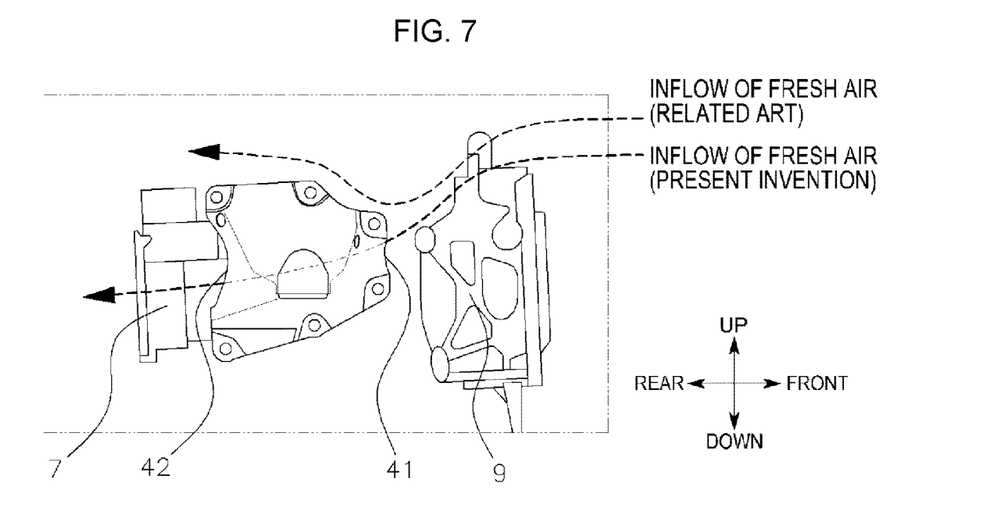
FIG. 7 is a view illustrating a state in which the engine support bracket according to the exemplary embodiment of the present invention is cooled by circulation of air.

FIG. 7 is a view illustrating a state in which the engine support bracket according to the exemplary embodiment of the present invention is cooled by circulation of air.

Referring to FIG. 7, air (fresh air), which is introduced into a front side of the engine compartment, flows toward a rear side of the engine compartment while bypassing auxiliary machinery 9 including an alternator.

Since the engine support bracket 10 in an exemplary embodiment of the present invention has the intake port 41 opened in the direction in which the moving device moves forward, the air at the front side of the engine support bracket may be introduced into the air flow path 40. The introduced air is discharged to the rear side of the engine support bracket 10 through the discharge port 42.

Because an engine support bracket in the related art does not include the intake port, air may flow only into an external portion of an engine support bracket. In contrast, since the engine support bracket according to an exemplary embodiment of the present invention has the intake port at the front side thereof, air (fresh air) may be introduced into the engine support bracket as well as the external side of the engine support bracket.

The aforementioned structure may allow cool fresh air to continuously flow, discharging heat of the engine support bracket 10 by use of the air.

Because the cooling system is operated by different types of fluids, it is possible to complementarily operate a plurality of cooling systems.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mounting structure comprising:
    an engine which is disposed in an engine compartment;
    an engine mount which fixes the engine to a vehicle body; and
    an engine support bracket which fixes one side surface of the engine to the engine mount,
    wherein the engine support bracket includes a cooling portion which is cooled by a fluid flowing into the engine compartment;
    a transmission which is provided at one side of the engine; and
    a transmission oil supply pipe which extends from an oil cooler toward the transmission and through which a transmission oil flows,
    wherein the cooling portion is a cooling path which exchanges heat with the transmission oil flowing into the transmission oil supply pipe, and
    wherein the transmission oil supply pipe includes:
        a first transmission oil pipe which extends from the oil cooler toward the cooling path; and
        a second transmission oil pipe which extends from the cooling path toward the transmission, and
    wherein the cooling path includes:
        an expanded tube portion which is connected to the first transmission oil pipe and has a diameter that is increased toward a downstream side thereof; and
        a shrunk tube portion which connects the expanded tube portion and the second transmission oil pipe, and has a diameter that is decreased toward the downstream side thereof.

2. The engine mounting structure of claim 1, wherein a flow velocity of the transmission oil passing through the expanded tube portion is decreased, a flow velocity of the transmission oil passing through the shrunk tube portion is increased, and the flow velocity of the transmission oil is lowest at a boundary between the expanded tube portion and the shrunk tube portion.

3. The engine mounting structure of claim 1, wherein the engine support bracket further includes:
    a first engine fastening portion which is provided on an upper portion of the engine support bracket and abuts one side surface of the engine;
    a second engine fastening portion which is provided on a lower portion of the engine support bracket and abuts one side surface of the engine;
    a mount fastening portion which is provided at one side portion of the engine support bracket and to which the engine mount is fastened; and
    an extension portion which connects the first engine fastening portion and the mount fastening portion, and connects the second engine fastening portion and the mount fastening portion, and
    the cooling portion is an air flow path through which air flowing into an external space of the engine support bracket flows into a space between the first engine fastening portion and the second engine fastening portion.

4. The engine mounting structure of claim 3, wherein the air flow path includes:
    an intake port which is open in a direction in which a moving means moves forward thereof; and
    a discharge port which is open in a direction in which the moving means moves rearward thereof.

5. The engine mounting structure of claim 3, further including:
    wherein the cooling path, which exchanges heat with the transmission oil flowing into the transmission oil supply pipe, is provided in the extension portion.

6. The engine mounting structure of claim 5,
wherein the shrunk tube portion through which the transmission oil passing through the expanded tube portion is discharged to the first transmission oil pipe.

7. The engine mounting structure of claim 1, further including:
a heat protector which is disposed on one side surface of the engine, and prevents heat from being transferred from an external of the engine to an internal of the engine,
wherein the engine support bracket is disposed to abut the heat protector, and absorbs heat of the heat protector.

8. The engine mounting structure of claim 7, wherein the engine includes a starter motor, and the heat protector prevents heat from being transferred from the engine compartment to the starter motor.

9. The engine mounting structure of claim 7, wherein the engine support bracket is formed integrally with the heat protector.

* * * * *